US009088421B2

(12) United States Patent
Takahashi et al.

(10) Patent No.: US 9,088,421 B2
(45) Date of Patent: Jul. 21, 2015

(54) DATA TRANSMITTING DEVICE, DATA RECEIVING DEVICE, AND COMPUTER-READABLE STORAGE MEDIUM

(71) Applicants: Toshinari Takahashi, Tokyo (JP); Hideyuki Miyake, Kawasaki (JP)

(72) Inventors: Toshinari Takahashi, Tokyo (JP); Hideyuki Miyake, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 385 days.

(21) Appl. No.: 13/709,639

(22) Filed: Dec. 10, 2012

(65) Prior Publication Data
US 2013/0246801 A1    Sep. 19, 2013

(30) Foreign Application Priority Data
Mar. 13, 2012    (JP) .................................. 2012-55603

(51) Int. Cl.
H04L 9/32     (2006.01)
H04L 29/06    (2006.01)

(52) U.S. Cl.
CPC ............... *H04L 9/3297* (2013.01); *H04L 63/12* (2013.01); *H04L 63/123* (2013.01); *H04L 63/14* (2013.01); *H04L 63/1408* (2013.01)

(58) Field of Classification Search
CPC ..... H04L 9/3263; H04L 9/3297; H04L 63/14; H04L 63/12; H04L 63/123; H04L 63/1408
USPC ........................................................ 713/178
See application file for complete search history.

(56) References Cited

U.S. PATENT DOCUMENTS

| 5,511,122 A | 4/1996 | Atkinson |
| 6,839,434 B1 | 1/2005 | Mizikovsky |
| 7,207,061 B2 | 4/2007 | Martin |

(Continued)

FOREIGN PATENT DOCUMENTS

| JP | 11-316740 | 11/1999 |
| JP | 2003091503 | 3/2003 |

(Continued)

OTHER PUBLICATIONS

Office Action mailed May 7, 2014 in counterpart Japanese Patent Application No. 2012-055603 and English-language transaltion thereof.

(Continued)

Primary Examiner — Jung Kim
Assistant Examiner — Ayoub Alata
(74) Attorney, Agent, or Firm — Nixon & Vanderhye, P.C.

(57) ABSTRACT

According to one embodiment, the data transmitting device includes a storing unit, an authenticator generating unit, and a communication unit. The storing unit stores accuracy information based on an accuracy of synchronization between a first clock and a second clock. The first clock indicates a current time of the data transmitting device. The second clock indicates a current time of other device to be a destination of a data packet. The authenticator generating unit calculates a first time by adding a predetermined time to the current time of the data transmitting device, calculates a second time by adjusting the first time using the accuracy information, and generates an authenticator using the second time, the data packet, and a predetermined secret key. The communication unit transmits, to the other device, the data packet with the authenticator at a third time obtained by adding the second time to a predetermined time.

14 Claims, 3 Drawing Sheets

(56) References Cited

U.S. PATENT DOCUMENTS

| | | |
|---|---|---|
| 8,386,800 B2 | 2/2013 | Kocher et al. |
| 8,732,463 B2 | 5/2014 | Takahashi et al. |
| 2003/0005284 A1 | 1/2003 | Euchner |
| 2003/0046409 A1 | 3/2003 | Graham |
| 2003/0056097 A1 | 3/2003 | Araki et al. |
| 2003/0177398 A1 | 9/2003 | Safa |
| 2003/0204728 A1 | 10/2003 | Irwin |
| 2004/0205210 A1 | 10/2004 | Hamano |
| 2005/0102503 A1 | 5/2005 | Imai |
| 2006/0126845 A1 | 6/2006 | Zheng |
| 2006/0133613 A1 | 6/2006 | Ando et al. |
| 2008/0010218 A1 | 1/2008 | Zank |
| 2008/0022092 A1 | 1/2008 | Sakaguchi |
| 2008/0066184 A1 | 3/2008 | Ben-Ami et al. |
| 2008/0115194 A1 | 5/2008 | Apostolopoulos |
| 2008/0181403 A1 | 7/2008 | Sakamoto |
| 2008/0301776 A1 | 12/2008 | Weatherford |
| 2009/0154496 A1 | 6/2009 | Fujinami |
| 2009/0249490 A1 | 10/2009 | Umesawa et al. |
| 2009/0271860 A1 | 10/2009 | Nonaka et al. |
| 2010/0132025 A1 | 5/2010 | Imai |
| 2010/0293377 A1 | 11/2010 | Tardo |
| 2011/0321145 A1 | 12/2011 | Shimotono |
| 2012/0054495 A1 | 3/2012 | Takahashi et al. |
| 2012/0233461 A1 | 9/2012 | Takahashi et al. |
| 2013/0129093 A1 | 5/2013 | Patel |
| 2013/0246801 A1 | 9/2013 | Takahashi et al. |

FOREIGN PATENT DOCUMENTS

| | | |
|---|---|---|
| JP | 2003-115026 | 4/2003 |
| JP | 2005130445 | 5/2005 |
| JP | 2010508719 | 3/2010 |
| WO | 2008052137 | 5/2008 |
| WO | 2010024379 | 3/2010 |

OTHER PUBLICATIONS

Krawczyk, H. et al., HMAC: Keyed-Hashing for Message Authentication (RFC2104), (Feb. 1997), 10 pages.

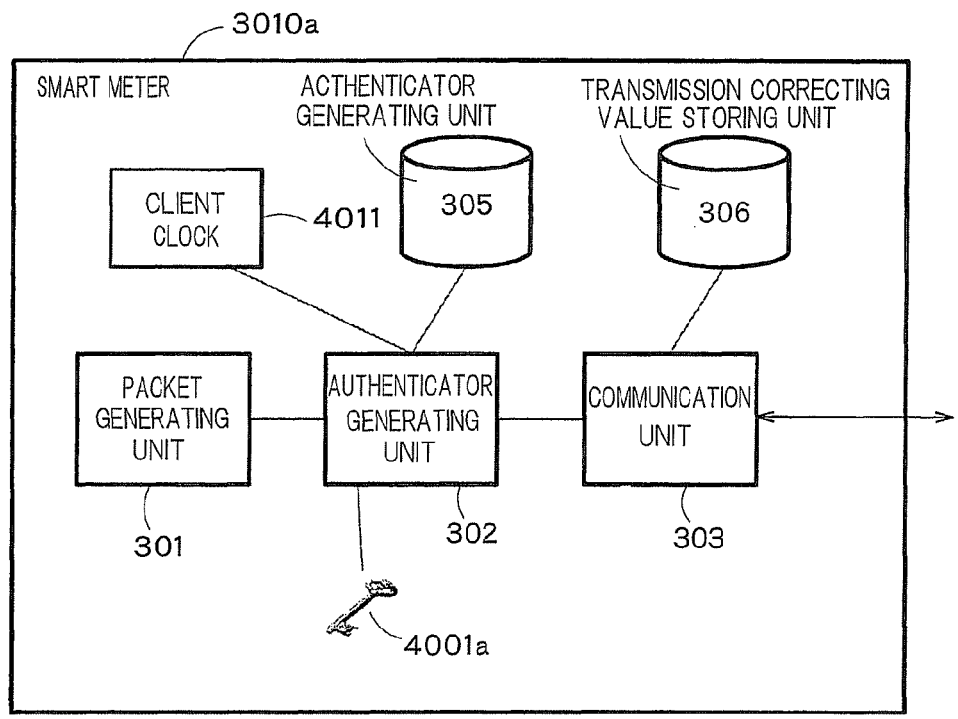
F I G. 3
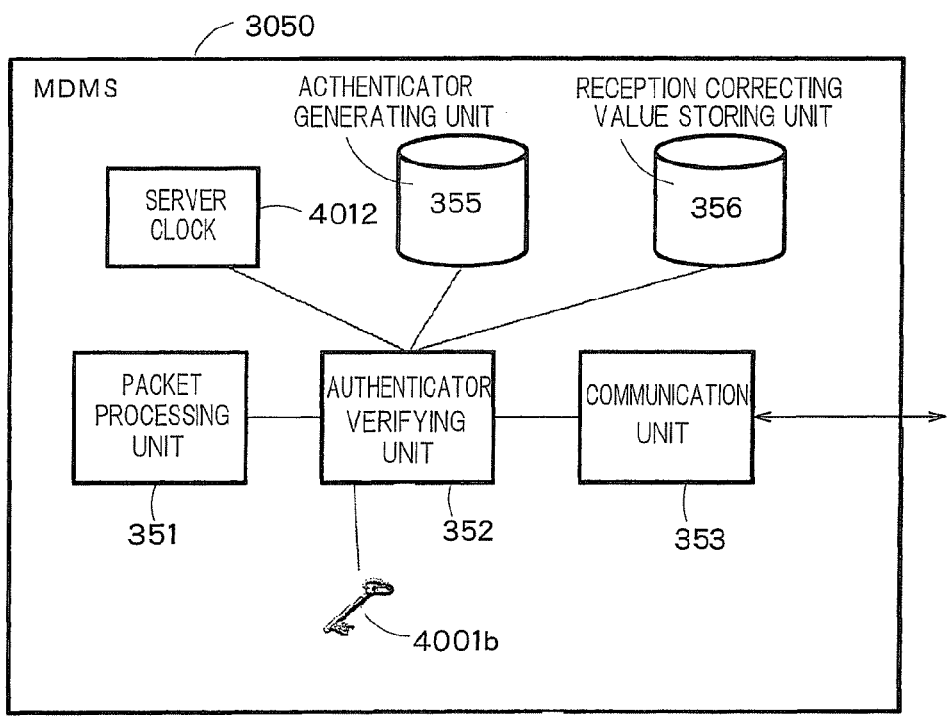
F I G. 4

DATA TRANSMITTING DEVICE, DATA RECEIVING DEVICE, AND COMPUTER-READABLE STORAGE MEDIUM

CROSS REFERENCE TO RELATED APPLICATION

This application is based upon and claims benefit of priority from the Japanese Patent Application No. 2012-55603, filed on Mar. 13, 2012, the entire contents of which are incorporated herein by reference.

FIELD

Embodiments described herein relate generally to a data transmitting device, a data receiving device, and a computer-readable storage medium.

BACKGROUND

When data communication is performed between network equipments, an equipment authentication is performed to determine whether the communication correspondent on the other end is valid. For example, the transmitting equipment uses a secret key known only by the transmitting equipment to generate a data packet and transmit the packet. The receiving equipment uses a secret key that the receiving equipment owns or a public key to determine whether the received data packet is the one generated by the transmitting equipment. As a technique for the equipment authentication, an hmac or a technique where a signature is attached to data using a public-key cryptography is known. The hmac is a technique where the hash value of data is found using a shared key to set the value as the authenticator.

In such a technique using a key to generate a data packet, it can be determined that the received data packet has been generated by the transmitting equipment. However, it cannot be found that an eavesdropping by a third party in the middle of the communication has caused the late arrival of the data, or that a third party has repeatedly transmitted absolutely the same data at different times (replay attack).

Thus, a data packet including not only a key but also the time information is generated. Accordingly, even if a third party tries to falsify the time information recorded in the data packet, only a valid transmitting equipment that knows the key can generate a correct authenticator. This can prevent a fraud such as the above-mentioned replay attack or the like.

However, storing time information in every data packet increases the volume of data. This reduces the communication speed or increases the throughput of the memory.

To prevent a fraud such as the replay attack or the like, it can also be considered, instead of storing time information in each packet, that the equipments communicating to each other have clocks precisely time-matched between the clocks in order to communicate to each other based on the time indicated by the clocks. However, it is difficult to implement highly accurate clocks of which times are exactly matched.

BRIEF DESCRIPTION OF THE DRAWINGS

FIG. 3 is a schematic view of a data transmitting device according to the first embodiment;

FIG. 4 is a schematic view of a data receiving device according to the first embodiment;

DETAILED DESCRIPTION

According to one embodiment, the data transmitting device includes a storing unit, an authenticator generating unit, and a communication unit. The storing unit stores accuracy information based on an accuracy of synchronization between a first clock and a second clock. The first clock measures a time of the data transmitting device. The second clock measures a time of other device to be a destination of a data packet. The authenticator generating unit calculates a first time by adding a predetermined time to the current time of the data transmitting device, calculates a second time by correcting the first time using the accuracy information, and generates an authenticator using the second time, the data packet, and a predetermined secret key. The communication unit transmits, to the other device, the data packet with the authenticator at a third time obtained by adding the second time to a predetermined time.

Embodiments will now be explained with reference to the accompanying drawings.

(First Embodiment)

Figure 1:
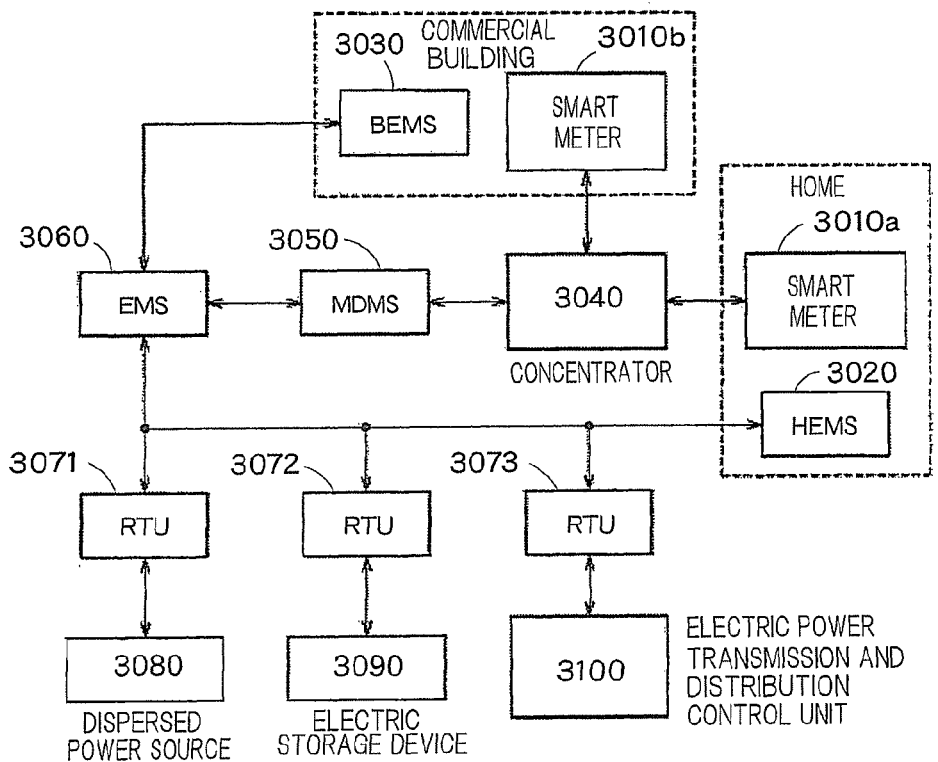
FIG. 1 is a view for showing an exemplary configuration of a smart grid.

FIG. 1 is an example for showing the structure of a next-generation electrical communication network (smart grid) using an equipment authentication method according to the first embodiment. The equipments included in the smart grid are connected through a public network such as the Internet or the like in order to be able to communicate to each other.

In the smart grid, a smart meter 3010a for calculating the electric power consumption and a home energy management system (HEMS) 3020 that is a home server for managing the electric household appliances are provided at each home. Further, a smart meter 3010a for calculating the electric power consumption and a building energy management system (BEMS) 3030 that is a server for managing electric appliances in the building are provided at a commercial building.

The smart meters 3010a integrated with smart meters 3010b in several units by a concentrator (repeater) 3040 to communicate with a meter data management system (MDMS) 3050 through the communication network. The MDMS 3050 receives electric power consumption amounts from the smart meters 3010a and 3010b of each home or building and stores the amounts at regular intervals. Based on the electric power consumption of a plurality of homes and buildings that collected to the MDMS 3050, or information from a sensor provided in a power system, an energy management system (EMS) 3060 controls the electric power, for example, by requesting the smart meters 3010a and 3010b, the HEMS 3020, the BEMS 3030 and the like to curb electric power consumption.

Further, the EMS 3060 controls a dispersed power source 3080 such as a solar power generation, a wind power generation or the like, an electric storage device 3090, and an electric power transmission and distribution control unit 3100 to stabilize the voltage and the frequency of whole the power system network. The dispersed power source 3080 is connected to a remote terminal unit (RTU) 3071. The electric storage device 3090 is connected to an RTU 3072. The electric power transmission and distribution control unit 3100 is connected to an RTU 3073 and is configured to control the amount of the power transmission between the transmitting side and the RTUs.

As shown FIG. 1, various types of equipments are coupled to each other through the network in the smart grid. Most of the equipments relate to the control of the power system network. Thus, it is necessary to authenticate all the data in order to prevent a fraudulent data transmission. The equipment authentication method according to the present embodiment can be used for a data authentication between given equipments included in the smart grid.

For example, when the smart meter 3010a at home transmits data and the MDMS 3050 receives the data, the smart meter 3010a and the MDMS 3050 perform equipment authentications using the equipment authentication method according to the present embodiment. The smart meter 3010a is a data transmitting client. The MDMS 3050 is a data receiving server.

Figure 2:
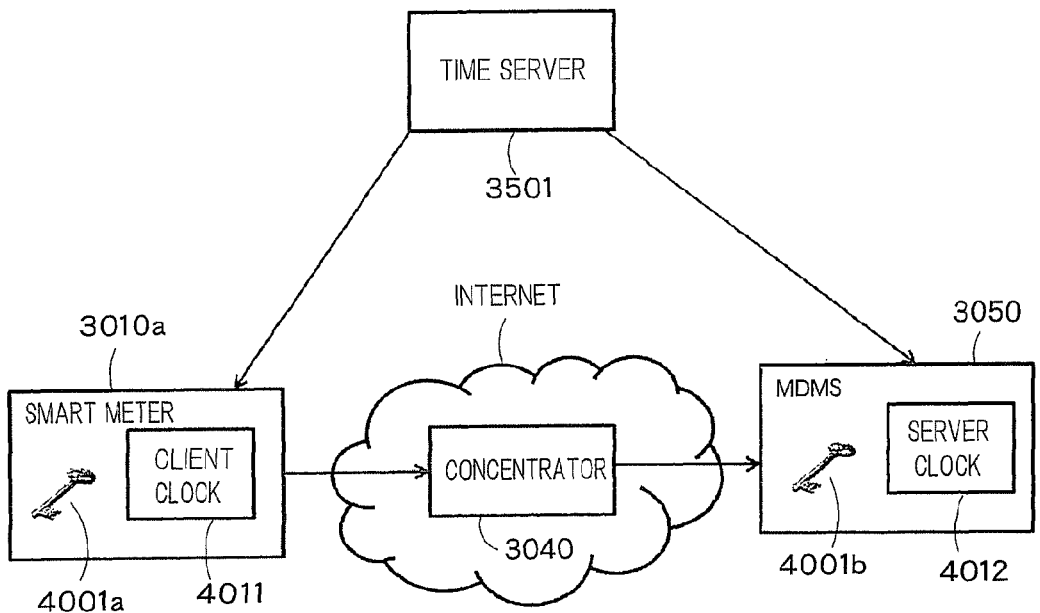
FIG. 2 is a schematic view of a data communication system according to a first embodiment.

FIG. 2 is a simplified view of an example showing that the smart meter 3010a transmits a data packet to the MDMS 3050 through the concentrator 3040 using a network line (the Internet or the like).

The smart meter 3010a that is a data transmitting client has obtained a secret key 4001a and stored the key in advance. The MDMS 3050 that is a data receiving server has obtained a verification key 4001b and stored the key in advance. The secret key 4001a and the verification key 4001b are conjugated in light of encryption technology. For example, when an authentication is performed using a common key, the secret key 4001a has the same value as the verification key 4001b. Alternatively, when an authentication is performed using a public key, the secret key 4001a and the verification key 4001b are a secret key and a public a key in public-key cryptography system. When the secret key 4001a and the verification key 4001b are conjugated in light of theory of cryptography, the keys can have any configurations.

The smart meter 3010a includes a client clock 4011 for measuring the time of the smart meter 3010a. When transmitting a packet, the smart meter 3010a generates the information for authentication (authenticator) using the secret key 4001a and the time information indicated by the client clock 4011, and attaches the authenticator to the packet in order to transmit the packet. Specifically, for example, data to be transmitted, the secret key 4001a, and the time information of the client clock 4011 are assumed as the inputs of a hash function. The output of the hash function (a hash value) is assumed as the authenticator of the packet and is attached to the packet and transmitted. When the packet is transmitted, the secret key 4001a and the time information are not transmitted.

The MDMS 3050 includes a server clock 4012 for measuring the time of the equipment having the server clock. When receiving the packet, the MDMS 3050 verifies, using the verification key 4001b and the time information indicated by the server clock 4012, whether the authenticator included in the received packet is correct. Specifically, for example, the received data, the verification key 4001b, and the time information of the server clock 4012 are assumed as the inputs of a hash function. When the output of the hash function (a hash value) corresponds to the authenticator attached to the packet, the MDMS 3050 determines the packet as a packet that has been transmitted from the valid equipment (the smart meter 3010a). When the hash value does not correspond to the authenticator, the MDMS 3050 determines the packet as an invalid packet and discards the received packet or replies to indicate an error in that the packet is an invalid packet.

Although it is described that the secret key 4001a and the verification key 4001b are a common key in the above-mentioned example using a hash function, the authentication method is not limited to the example. For example, the signature using a public-key cryptography and the verification method of the signature are widely used and are easily implemented using the combination of the existing techniques. Thus, the detailed description of the signature and the method will not be made.

In the present embodiment, the smart meter 3010a uses the time information of the client clock 4011 to generate an authenticator, and the MDMS 3050 uses the time information of the server clock 4012 to verify the authenticator. However, the time of the client clock 4011 and the time of the server clock 4012 usually do not precisely correspond to each other. There is a slight gap. Calculating the authentication using the times having a gap without modification leads obtaining an incorrect result. The method for treating the time according to the present embodiment in light of such a problem will be described below.

Note that it is assumed that the above-mentioned client clock 4011 and server clock 4012 show almost correct times, respectively. Although, for example, an accurate clock using a precise crystal oscillator or the like can be used to establish the assumption, a time server 3501 for synchronizing time is generally provided as shown in FIG. 2. At least one of the client clock 4011 and the server clock 4012 receives the information about the current time from the time server 3501 as needed to maintain the almost correct time.

The time server 3501 is, for example, a GPS satellite. The smart meter 3010a and the MDMS 3050 receive the time information via radio waves, and transmit the time information to the client clock 4011 and the server clock 4012, respectively. Alternatively, the time server 3501 can synchronize the time by a method such as a network time protocol (NTP) while communicating with the smart meter 3010a and the MDMS 3050 through the Internet. The method for synchronizing time is not limited. Further, although a time server 3501 is provided in the example shown in FIG. 2, a plurality of time servers can be provided to obtain more accurate information.

Needless to say, the time server 3501 is not required when the time of the client clock 4011 and the time of the server clock 4012 are synchronized with each other in advance by any method and the error after the synchronization makes no difference.

Note that, of course, the concentrator 3040 can implement the equipment authentication method according to the present embodiment although it is assumed in the present embodiment that the concentrator 3040 has only a function to transmit a packet and does not perform a verification of an authentication or the like.

FIG. 3 is a schematic view of the structure of a data transmitting device provided at the smart meter 3010a. The data transmitting device includes a packet generating unit 301, an authenticator generating unit 302, a communication unit 303, an accuracy information storing unit 305, and a transmission correcting value storing unit 306. The packet generating unit 301 generates a data packet to be transmitted. The packet generating unit 301 generates an Internet Protocol (IP) packet because an IP communication is usually used for a communication on the Internet. The detailed description is not made because this is a function included in a general communication equipment.

The authenticator generating unit 302 refers to a destination IP address that is indicated at the header part of the IP packet. When determining that the destination equipment is the MDMS 3050, the authenticator generating unit 302 generates an authenticator using the secret key 4001a. In the example, only the secret key 4001a is used because only a case where the destination is the MDMS 3050 is described. When there is a plurality of data destinations, different keys can be used from one destination to the other. In that case, the data transmitting device is provided with a storing unit configured to store a table where the destination equipment is corresponded to a secret key for generating an authenticator for each of the equipments. The authenticator generating unit 302 refers to the table to retrieve the key corresponding to the destination equipment. The authenticator generating unit 302 uses a value to generate an authenticator corresponding to a packet to be transmitted. The value is obtained from correcting (adjusting) the current values (current times) of the secret key 4001a and the client clock 4011. The method for correcting (adjusting) the current value of the client clock 4011 will be described below.

Various systems known in the past can be used for the algorithms for generating an authenticator and are not especially limited. For example, the data of the packet and a value obtained by correcting the current value of the client clock 4011 are set as the inputs to perform a hash calculation with a key using the secret key 4001a in order to generate an authenticator using the hmac system. The same data and key that are the inputs always generate the same authenticator in the hmac system. The inputs further including the time generate a different authenticator at a different time even though the packet has the same data. This increases safety.

To generate an authenticator, the current time T0 of the client clock 4011 without modification is not used, but a value that has been modified by the processes mentioned below is used in the present embodiment.

First, the authenticator generating unit 302 corrects the time T0 as a time T1 near the time when the packet is actually transmitted. For example, to calculate the time T1, a processing time is added to the time T0. The processing time is required to actually transmit the packet from the communication unit 303 to the MDMS 3050 since the authenticator generating unit 302 has received the packet from the packet generating unit 301. Further, to calculate the time T1, a communication time can be added to the time T0. The communication time is required for the MDMS 3050 to actually receive the packet since the communication unit 303 has transmitted the packet.

Next, to generate a time T2, the authenticator generating unit 302 rounds the time T1 (rounds the fractions) using accuracy information stored in the accuracy information storing unit 305. For example, when the client clock is accurate to around 5 seconds in the system shown in FIG. 2, it is difficult for the smart meter 3010a and the MDMS 3050 to share the same time even though the time in a second unit is used. Thus, to obtain the time T2, the time T1 is rounded, for example, to be accurate to 20 seconds.

The accuracy information storing unit 305 stores the accuracy information. The accuracy information is about the unit for rounding. The accuracy information has been predetermined in advance. For example, the information corresponds to a value indicating "20 seconds" in the present embodiment.

The authenticator generating unit 302 generates an authenticator using the time T2 obtained by the processes, and attaches the generated authenticator to the IP packet. The method for attaching an authenticator is preferably complied with the existing Internet protocol (IP) specification. For example, the authenticator is stored as the data in the option part of the IP header. The authenticator can be stored, for example, in the option part of a TCP header, or the data part of the TCP header that does not have data such as TCP/SYN. An Authentication Header (AH) in a recent extended IP sec protocol is also considered to be an authenticator storing field.

The communication unit 303 transmits the packet with the authentication attached by the above-mentioned method toward the MDMS 3050 that is a server through the concentrator 3040.

According to the processes, a value rounded in 20 seconds unit is used to calculate an authenticator. Thus, for example, the authenticator of the packet that has been sent around 9:8:18 is calculated using 9:8:20 that is the value rounded by 20 seconds. Even though the server clock 4012 of the MDMS 3050 is out of synchronization in some degree and the MDMS 3050 receives the packet, for example, at 9:8:25, the receiving time is rounded and becomes 9:8:20 that is the same as the transmitting side. The receiving time corresponds to the transmitting time. Thus, the MDMS 3050 can verify the packet according to whether a value calculated using the time indicated by the server clock 4012 (for example, a hash value) corresponds to the authenticator attached to the packet. However, the time slot boundary is ambiguous in the method. It is not defined, for example, whether the time T2 used for the packet that has been transmitted around 9:8:30 seconds is 9:8:20 or 9:8:40. Thus, it is highly possible that the time used by the transmitting side to generate the authenticator differs from the time used by the receiving side to verify the packet.

To prevent such a gap between the times, for example, the packet is transmitted in 20-second units using the time T2. This causes the MDMS 3050 to often receive the packet around 9:8:20 and around 9:8:40. Thus, this decreases the possibility of receiving the packet at a confusable period of time around 9:8:30 (time slot boundary).

However, all the packets can be transmitted only at intervals of 20 seconds in the method. This causes communication overload. It is not desirable that only a smaller amount of data than the amount of the actual communication performance of the network can be transmitted.

In light of the foregoing, the packet is transmitted at a time 13 in the present embodiment. The time T3 is obtained by adding a predetermined transmission correcting value to the time T2. Instead of readily transmitting the packet with the authenticator, the communication unit 303 pauses until the time T3 obtained by adding a predetermined transmission correcting value to the time T2 in order to transmit the packet. The predetermined transmission correcting value has been stored in the transmission correcting value storing unit 306 in advance. The time T2 is a value calculated by the authenticator generating unit 302. For example, when the time T2 used for generating the authenticator is 9:8:20 and the transmission correcting value stored in the transmission correcting value storing unit 306 is 12 seconds, the communication unit 303 transmits the packet at 9:8:32.

The smart meter 3010a transmits the packet with the authenticator in that manner and the MDMS 3050 receives the packet.

FIG. 4 is a schematic view of the structure of a data receiving device provided in the MDMS 3050. The data receiving device includes a packet processing unit 351, an authenticator verifying unit 352, a communication unit 353, an accuracy information storing unit 355, and a reception correcting value storing unit 356.

The communication unit 353 receives the packet with the authentication that has been transmitted from the smart meter 3010a. The communication unit 353 records the reception time T4 and transmits the packet and the reception time T4 to the authenticator verifying unit 352. The time when the authenticator verifying unit 352 receives the packet from the communication unit 353 can be set as the reception time T4.

For example, the client clock 4011 shows 9:8:32 as the time when the smart meter 3010a has transmitted the packet. When it is assumed that it has taken 2 seconds for the smart meter 3010a to communicate with the MDMS 3050, the reception time T4 is set as a value obtained by adding the length of the error between the server clock 4012 and the client clock 4011 to 9:8:34. For example, when the server clock 4012 goes faster than the client clock 4011 by 5 seconds, the MDMS 3050 measures the reception time 14 as 9:8:39.

The authenticator verifying unit 352 performs the same calculation as the smart meter 3010a (transmitting equipment side) in order to calculate a verification authenticator. First, the authenticator verifying unit 352 calculates a time 15. The time T5 is obtained by subtracting a reception correcting value from the time T4. The reception correcting value has been stored in the reception correcting value storing unit 356 in advance. The reception correcting value is obtained by adding a communication time to the transmission correcting value. The transmission correcting value is stored in the transmission correcting value storing unit 306 of the smart meter 3010a. The communication time is required for the MDMS 3050 to receive the packet since the smart meter 3010a has transmitted the packet. For example, when the transmission correcting value is 12 seconds and the communication time is around 1 second, the reception correcting value becomes 13 seconds. Of course, it is not necessary to precisely set the reception correcting value as such a value. The value can be safely set around this amount of value. Thus, the time T5 becomes 9:8:26. The time has been obtained by subtracting 13 seconds from 9:8:39 (=the reception time T4).

Next, the authenticator verifying unit 352 calculates a time 16. The time T6 is obtained by rounding the value of the time T5 (rounding the fractions) according to accuracy information stored in the accuracy information storing unit 355 in advance (20 seconds in the present example). Then, the authenticator verifying unit 352 uses the time T6 to calculate a verification authenticator. For example, when the time T5 is 9:8:28 and the accuracy information is 20 seconds, the time 16 becomes 9:8:20.

The authenticator verifying unit 352 of the MDMS 3050 that is the equipment on the receiving side can obtain the time T6 that corresponds to the time T2 in that manner. The time T2 has been used when the authenticator generating unit 302 of the smart meter 3010a that is the equipment on the transmitting side has calculated the authenticator.

To find a verification authenticator, the authenticator verifying unit 352 uses the time T6, the verification key 4001b, and the data of the packet (excepted the part of the authenticator) to perform the same calculation as it has been performed when the smart meter 3010a that is the equipment on the transmitting side has generated the authenticator. When the packet received by the MDMS 3050 is valid, the calculated value of the verification authenticator is identical to the value of the authenticator of the packet. It is because the same calculation is performed with the same inputs. Thus, the packet can be verified according to whether the calculated verification authenticator is identical to the authenticator included in the packet. In other words, when the verification authenticator is identical to the authenticator included in the packet, the verification is regarded to be successful. Then, the packet is transmitted to the packet processing unit 351, and a normal process such as the start of an application is performed. On the other hand, when the verification authenticator differs from the authenticator included in the packet, the verification is regarded to have failed. The data is not transmitted to the packet processing unit 351, and the process is terminated. When the verification fails, some data indicating the verification error can be transmitted to the processing unit 351 or the communication unit 353.

As described above, according to the present embodiment, it is not necessary to store the value of the time T2 in the packet. It is also not necessary that the times of the server/client completely correspond to each other. This can implement an efficient communication with reducing the communication load. Further, this can use a time to verify the equipment without using a highly accurate clock.

According to the present embodiment, in a smart grid network, for example, that combines a plurality of communication equipments connected to each other via a communication line such as the Internet and having various performances and characteristics, or that combines communication networks having various characteristics, for example, wired and wireless communication networks, when a data verification is performed between the equipments, the communicating equipments (transmitting equipment and receiving equipment) have the accuracy information for synchronizing the clocks and secret keys in advance, and corrects the times of the clocks to use the value rounded according to the clock accuracy in order to generate/verify the authenticator of the packet. Thus, the equipments communicating with each other can perform an equipment verification using a time without storing the time information itself in the data packet.

Note that the client clock 4011 and the server clock 4012 are assumed as clocks indicating an actual time such as what time, how many minutes and seconds in the present embodiment for convenience of description. However, the clocks can have any configurations as long as they are counters for generating different authenticators at different times. For example, the clock can be a counter that goes once every three seconds. Further, the beginning point where the count value of the counter is zero can be set as any time. Furthermore, for some purposes, the clock can be a simple counter, for example, that turns back to the beginning one year later. Of course, when only the counter that turns back to the beginning one year later is used, the same authenticator is generated a year later. Even in such a case, it is easy to use an input parameter other than a clock to calculate an authenticator.

(Second Embodiment)

Although a MDMS 3050 that is a server and a smart meter 3010a that is a client is provided in the description of the first embodiment, a plurality of MDMSs 3050 and/or smart meters 3010a can be provided.

Figure 5:
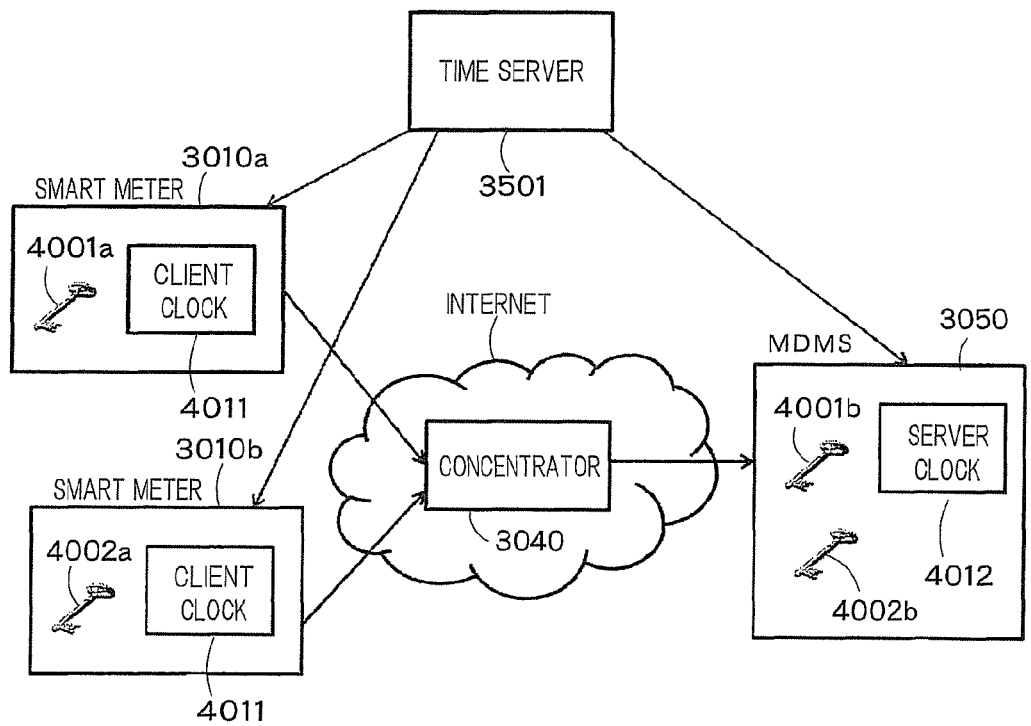
FIG. 5 is a schematic view of a data communication system according to a second embodiment.

For example, as shown in FIG. 5, two smart meters 3010a and 3010b, and a MDMS 3050 can be provided. The smart meters 3010a and 3010b can have the same structure, or at least a part of the parameter can be different from the other. The parameters relate to the generation of an authenticator and the transmission of a packet. Specifically, a secret key 4001a used by the smart meter 3010a can differ from a secret key 4002a used by the smart meter 3010b. The accuracy information and the transmission correcting value of the smart meter 3010a can also differ from the accuracy information and the transmission correcting value of the smart meter 3010b. The MDMS 3050 includes parameters corresponding to the smart meters 3010a and 3010b, respectively. A pair of the smart meter 3010a and the MDMS 3050 and a pair of the smart meter 3010b and the MDMS 3050 (combinations) have different parameters, respectively. This makes it difficult to commit a fraud and increases the safety in light of theory of cryptography. Further, there are advantages described below.

The accuracies of the clocks of all the equipments are not necessarily the same. For example, when the system combines a cheap equipment having a clock accurate to around 20 seconds and an expensive equipment having a clock accurate to around a second and the system is designed on the assumption that all the equipments are accurate to around 20 seconds, the time slot for generating the same authenticator for the same packet is set around 20 seconds in the expensive equipment accurate to around a second. Thus, there is a possibility that the expensive equipment cannot exert enough of safety. Alternatively, in a case where the system is designed on the assumption that all the equipments are accurate to around a second, there is a possibility that the cheap equipment accurate to around 20 seconds increasingly fails to verify a valid communication. This possibly decreases the efficiency of the communication, for example, due to the increased retransmission processes of a packet. However, setting the accuracy of the time at each clock of the equipments solves these problems. Further, only the value of accuracy information to be predetermined has to be changed. It is not necessary to develop software for each of the equipments.

Further, varying the accuracy information and transmission correcting values of the equipments can prevent the transmission of the packet from being overloaded.

Further, as the times required for the communications of the equipments sometimes vary, for example, depending on the difference between the network configurations, the adjustment parameters of the equipments can also vary. As a result of that, setting different reception correcting values can implement more highly accurate parameter adjustment.

The system including a plurality of MDMSs 3050 or the system including a plurality of MDMSs 3050 and smart meters also has the same characteristics as described above. The MDMS 3050 is a server. The smart meter is a client.

(Third Embodiment)

It is necessary in the above-mentioned embodiment to appropriately set the accuracy information and the reception correcting value according to the length of the error between the client clock 4011 and the server clock 4012, and the length and the variation of the times required for the packet communications. However, the communication time between a specific smart meter and the MDMS 3050 cannot be predetermined because the time depends on an external factor such as network congestion. Accordingly, the accuracy information and the reception correcting value are preferably determined in consideration of the variation of the communication times.

For example, when each communication in 90% of cases takes 0.1 to 0.2 seconds and each communication in 99% of cases takes 0.1 to 0.3 seconds, the value obtained by adding 0.3 seconds or more to the transmission correcting value is preferably used as the reception correcting value. As described above, the reception correcting value and/or the accuracy information is preferably determined in consideration of the distribution of the communication times required to receive communication packets.

Further, there is a system where the communication time varies as needed. For example, when a communication can be performed in a wireless one-hop network, the communication time is around 0.3 seconds. When a communication can be performed through some intermediate nodes in a wireless mesh network, the communication time increases up to around 0.9 seconds. In such a case, the communication time can be set to have a margin of 1 to 2 seconds in consideration of the fact that the communication time increases up to around 0.9 seconds. However, changing the parameter as needed when the communication path is switched can set a more precise communication time. As a result of that, for example, retransmissions due to errors can be reduced. Accordingly, the reception correcting value and/or the accuracy information is preferably changed as needed according to the change of the communication time required to receive a communication packet. Traceroute can be used to detect the switching of the communication path or to determine that the communication path has switched when errors have continuously occurred.

(Fourth Embodiment)

Figure 6:
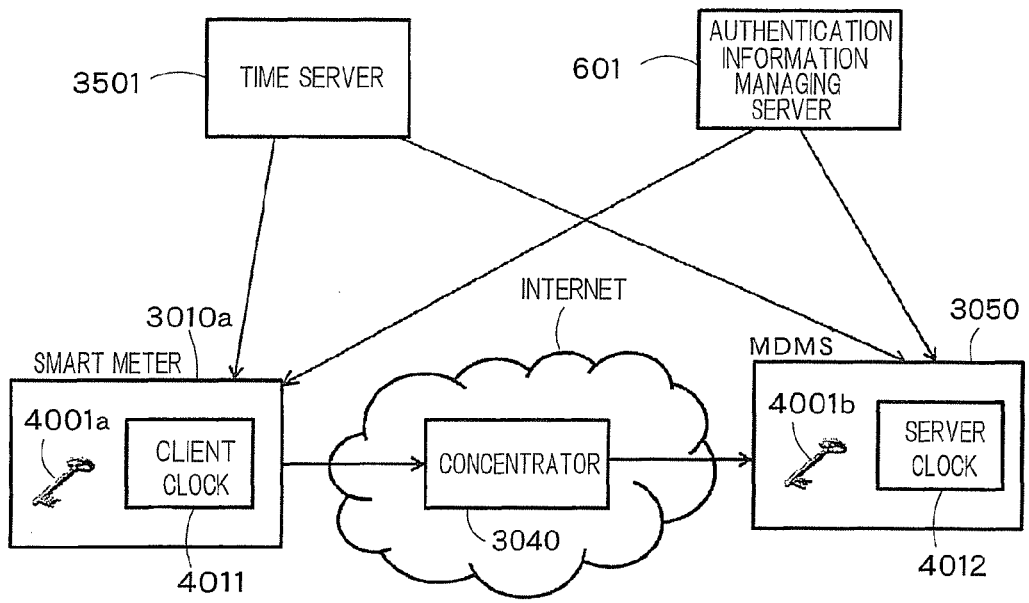
FIG. 6 is a schematic view of a data communication system according to a fourth embodiment.

FIG. 6 is a schematic view of the structure of a data communication system according to the fourth embodiment. FIG. 6 is a view of a structure where an authentication information managing server 601 is provided to the system shown in FIG. 2.

The authentication information managing server 601 communicates with an authentication equipment on the transmitting side (a smart meter 3010a) and can indicate the accuracy information, the secret key, the transmission correcting value or the like to the smart meter 3010a. Further, the authentication information managing server 601 communicates with an authentication equipment on the receiving side (an MDMS 3050) and can indicate the accuracy information, the verification key, the reception correcting value or the like to the smart meter 3010a.

There is a dependence relationship between the parameter used by the smart meter 3010a and the parameter used by the MDMS 3050. Thus, the parameters are not separately set, but the parameters are preferably set by the authentication information managing server 601.

Further, when a new smart meter is set, the authentication information managing server 601 can notify the smart meter of the verification key corresponding to the MDMS 3050. Furthermore, the authentication information managing server 601 can periodically notify the smart meter 3010a and the MDMS 3050 of a new key to update the key.

The data authentication between the equipments in a smart grid has been described in the above-mentioned embodiments. The data transmitting device and the data receiving device shown in FIGS. 3 and 4 can be applied to a communication system configured to perform an equipment authentication using a time.

At least part of the data transmitting device and the data receiving device described in the above embodiments may be implemented in either hardware or software. When implemented in software, a program that realizes at least part of functions of the data transmitting device and the data receiving device may be stored on a recording medium such as a flexible disk or CD-ROM and read and executed by a computer. The recording medium is not limited to a removable recording medium such as a magnetic disk or optical disk, but may be a non-removable recording medium such as a hard disk device or memory.

The program that realizes at least part of the functions of the data transmitting device and the data receiving device may be distributed through a communication line (including wireless communications) such as the Internet. Further, the program may be encrypted, modulated, or compressed to be distributed through a wired line or wireless line such as the Internet or to be distributed by storing the program on a recording medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data transmitting device comprising:
a packet generating unit, executed by a computer, that generates a data packet;
storage that stores accuracy information based on an accuracy of a synchronization between a first clock and a second clock, the first clock indicating a current time of the data transmitting device, the second clock indicating a current time of another device which is a destination of the data packet;
an authenticator generating unit, executed by a computer, that calculates a first time by adding a predetermined time to the current time of the data transmitting device indicated by the first clock, calculates a second time by adjusting the first time using the accuracy information, and generates an authenticator using the second time, the data packet, and a predetermined secret key; and
a transmitter that transmits, to the other device, the data packet with the authenticator at a third time obtained by adding the second time to a predetermined time, wherein
the authenticator generating unit calculates the first time by adding, to the current time indicated by the first clock, a time required for the authenticator generating unit to generate the authenticator and a time required for the transmitter to transmit data.

2. The device according to claim 1, wherein the authenticator generating unit calculates the second time by rounding fractions of the first time based on a time prescribed according to the accuracy information.

3. A data receiving device comprising:
a receiver that receives a data packet with an authenticator;
storage that stores accuracy information based on an accuracy of a synchronization between a first clock and a second clock, the first clock indicating a current time of the data receiving device, the second clock indicating a current time of another device which is a source of the data packet; and
a verifying unit, executed by a computer, that calculates a first time by subtracting a predetermined time from a reception time of the data packet, calculates a second time by adjusting the first time using the accuracy information, generates a verification authenticator using the second time, the data packet, and a predetermined key, and determines whether the authenticator attached to the data packet corresponds to the verification authenticator, wherein
the authenticator is generated at the other device based on the second clock, a time required for the other device to generate the authenticator and a time required for the other device to transmit data.

4. The device according to claim 3, wherein the verifying unit calculates the second time by rounding fractions of the first time based on a time prescribed according to the accuracy information.

5. The device according to claim 3, wherein the predetermined time and the accuracy information vary according to a source of a data packet.

6. The device according to claim 3, wherein the verifying unit changes the predetermined time or the accuracy information according to a change of a communication time of the data packet.

7. A non-transitory computer-readable storage medium storing a program which, when executed by a computer, causes the computer to execute steps comprising:
generating a data packet;
calculating a first time by adding a predetermined time to a current time of the computer indicated by a first clock;
calculating a second time by adjusting the first time using accuracy information based on an accuracy of a synchronization between the first clock and a second clock, the second clock indicating a current time of another device which is a destination of the data packet;
generating an authenticator using the second time, the data packet, and a predetermined secret key; and
transmitting, to the other device, the data packet with the authenticator at a third time obtained by adding a predetermined time to the second time, wherein
the first time is calculated by adding, to the current time indicated by the first clock, a time required to generate the authenticator and a time required to transmit data.

8. The storage medium according to claim 7, wherein the program allows a computer to calculate the second time by rounding fractions of the first time based on a time prescribed according to the accuracy information.

9. A non-transitory computer-readable storage medium storing a program which, when executed by a computer, causes the computer to execute steps comprising:
receiving a data packet with an authenticator;
calculating a first time by subtracting a predetermined time from a reception time of the data packet;
calculating a second time by adjusting the first time using accuracy information based on an accuracy of a synchronization between a first clock and a second clock, the first clock indicating a current time of the computer, the second clock indicating a current time of another device which is a source of the data packet;
generating a verification authenticator using the second time, the data packet, and a predetermined key; and
determining whether the authenticator attached to the data packet corresponds to the verification authenticator, wherein
the authenticator is generated at the other device based on the second clock, a time required for the other device to generate the authenticator and a time required for the other device to transmit data.

10. The storage medium according to claim 9, wherein the program allows a computer to calculate the second time by rounding fractions of the first time based on a time prescribed according to the accuracy information.

11. The storage medium according to claim 9, wherein the predetermined time and the accuracy information vary according to a source of a data packet.

12. The storage medium according to claim 9, wherein the program allows a computer to change the predetermined time or the accuracy information according to a change of a communication time of the data packet.

13. A data transmitting method comprising:
generating, using a computer, a data packet;
calculating, using a computer, a first time by adding a predetermined time to a current time of the computer indicated by a first clock;
calculating, using a computer, a second time by adjusting the first time using accuracy information based on an accuracy of a synchronization between the first clock and a second clock, the second clock indicating a current time of another device which is a destination of the data packet;

generating, using a computer, an authenticator using the second time, the data packet, and a predetermined secret key; and transmitting, to the other device, the data packet with the authenticator at a third time obtained by adding a predetermined time to the second time, wherein the first time is calculated by adding, to the current time indicated by the first clock, a time required to generate the authenticator and a time required to transmit data.

14. A data receiving method comprising:

receiving a data packet with an authenticator;

calculating, using a computer, a first time by subtracting a predetermined time from a reception time of the data packet;

calculating, using a computer, a second time by adjusting the first time using accuracy information based on an accuracy of a synchronization between a first clock and a second clock, the first clock indicating a current time of the computer, the second clock indicating a current time of another device which is a source of the data packet;

generating, using a computer, a verification authenticator using the second time, the data packet, and a predetermined key; and determining, using a computer, whether the authenticator attached to the data packet corresponds to the verification authenticator, wherein the authenticator is generated at the other device based on the second clock, a time required for the other device to generate the authenticator and a time required for the other device to transmit data.

* * * * *